United States Patent
Pucilowski et al.

(10) Patent No.: US 6,825,142 B2
(45) Date of Patent: Nov. 30, 2004

(54) INTERFERENCE FILTER HAVING A GLASS SUBSTRATE

(75) Inventors: Sally Pucilowski, Luzerne, PA (US); David G. Krashkevich, Dallas, PA (US)

(73) Assignee: Schott Glass Technologies, Inc., Duryea, PA (US)

( * ) Notice: Subject to any disclaimer, the term of this patent is extended or adjusted under 35 U.S.C. 154(b) by 46 days.

(21) Appl. No.: 10/036,486

(22) Filed: Jan. 7, 2002

(65) Prior Publication Data

US 2003/0092559 A1 May 15, 2003

Related U.S. Application Data

(60) Provisional application No. 60/317,493, filed on Sep. 7, 2001, and provisional application No. 60/259,706, filed on Jan. 5, 2001.

(51) Int. Cl.$^7$ ............................................. C03C 3/095
(52) U.S. Cl. ......................... 501/64; 501/78; 428/426; 428/64; 428/65
(58) Field of Search ................ 501/64, 78; 359/337, 359/341; 428/426, 64, 65

(56) References Cited

U.S. PATENT DOCUMENTS

| | | | |
|---|---|---|---|
| 3,898,093 A | * | 8/1975 | Faulstich et al. ............ 501/64 |
| 4,562,161 A | * | 12/1985 | Mennemann et al. ......... 501/59 |
| 6,268,304 B1 | * | 7/2001 | Maeda et al. ................. 501/65 |
| 6,306,786 B1 | * | 10/2001 | Koyama et al. .............. 501/69 |
| 6,333,286 B1 | * | 12/2001 | Kurachi et al. .............. 501/69 |
| 6,387,510 B1 | * | 5/2002 | Nakashima et al. ......... 428/426 |
| 6,461,733 B1 | * | 10/2002 | Goto .......................... 428/426 |
| 6,476,975 B1 | * | 11/2002 | Yoshii et al. ............... 359/652 |
| 2002/0065186 A1 | * | 5/2002 | Yoshii et al. ................ 501/63 |
| 2003/0050173 A1 | * | 3/2003 | Lin ............................ 501/70 |

FOREIGN PATENT DOCUMENTS

| | | | | |
|---|---|---|---|---|
| JP | 2000357318 A | * | 12/2000 | ............ G11B/5/73 |
| JP | 2002-249336 | | 9/2002 | |

OTHER PUBLICATIONS

Abstract Only:Parfenov AI, *Vestn. Leningr. Gos. Univ., Fiz. Khim*, 1963, vol. 4, No. 1, p. 126.
Abstract Only:Bacon JF., *NASA Contract Rep.* 1856, 1971.
Abstract Only:Alexsandrov VI., *Fizika i Khimiya Stekla*, 1997, vol. 3, No. 2, p.
Angel PW., Journal of American Chemical Society., 75 (12) : 3278–3282.

* cited by examiner

*Primary Examiner*—Karl Group
*Assistant Examiner*—Elizabeth A. Bolden
(74) *Attorney, Agent, or Firm*—Millen White Zelano & Branigan, P.C.

(57) ABSTRACT

The present invention generally relates to an interference filter including a glass substrate, useful in fiber optic systems.

32 Claims, No Drawings

INTERFERENCE FILTER HAVING A GLASS SUBSTRATE

This application claims the priority of Section 119(e) of U.S. Provisional Application No. 60/259,706, filed Jan. 5, 2001 and U.S. Provisional Application No. 60/317,493, filed Sep. 7, 2001.

Substrates that demand high expansion with good chemical durability are often manufactured from optical glasses. Optical glasses may be employed in various applications, such as substrates for thin-film interference filters used in fiber optic systems. Generally, these interference filters are fabricated from multiple layers of conducting and insulating materials or films that together result in a filter that passes only a narrow bandwidth of incident radiation. Such filters are described, for example, in *Optical Filter Design and Analysis—A Signal Processing Approach* by Christie K. Madsen and Jian H. Zhao published by John Wiley & Sons, 1999.

In one particular application, there is a strong demand for a glass substrate capable of being incorporated into an interference filter for wavelength division multiplexing (WDM) or dense wavelength division multiplexing (DWDM) applications. Thin-film interference filters for WDM and DWDM applications have high requirements in terms of the narrow bandwidth of light transmittal (*Introduction to DWDM Technology* by Stamatios V. Kartalopoulos, published by IEEE Press, 2000). Such bandwidths are expressed as a width in passed frequency, typically 200 GHz, 100 GHz, 50 GHz, or less, with smaller values indicating a narrower bandwidth of transmission. For example, a 100 GHz filter within the 1.5 $\mu$m telecommunications band corresponds to a wavelength spread of 0.8 nm; and, a 50 GHz filter within the same 1.5 $\mu$m telecommunications band corresponds to a wavelength spread of 0.4 nm. These filters preferably have bandwidths of less than 200 GHz pass frequency in the 1.5 $\mu$m wavelength region. An optical designer can fabricate useful telecommunications modules using such filters. For example, an optical demultiplexer can be constructed using a multitude of such thin-film interference filters, each one of which separates out a particular wavelength of interest.

Most desirably, the substrate is characterized by high transmission in the near IR where DWDM systems operate, i.e., wavelengths at or near 1.5 $\mu$m, a refractive index value at 587.6 nm, nd, of between 1.50 and 1.70, and a high transformation temperature, $T_g$, exceeding 350° C., most preferably exceeding 400° C. High transmission at 1.51 $\mu$m is characterized by a value of digital transmittance, including Fresnel reflection loss, exceeding 88%, more preferably equivalent to or exceeding 90% at 1.5 $\mu$m through a 1.0 mm thickness. Preferably, these filters have minimal wavelength drift with change in temperature. Glass substrates with high thermal expansion, CTE, and high values of Young's modulus, E, allow for decreased amounts of thermally-induced drift ($d\lambda/dT$) in the transmission wavelengths of interest, e.g., 1450–1620 nm, 1480–1620 nm, and 1450–1550 nm. A particularly desirable range of thermal expansion values is from 90 to $140 \times 10^{-7}/°$ C., particularly 110 to $140 \times 10^{-7}/°$ C., over a temperature range of $-30°$ C. to $+70°$ C. coupled with a Young's modulus >80 GPa. More preferably, the thermal expansion should lie in the range of 100 to $130 \times 10^{-7}/°$ C. over the same temperature range in combination with a Young's modulus value >85 GPa.

Such narrow bandwidths are highly demanding and difficult to achieve and push the limits of available coating technology. Consequently, the substrate properties are becoming more demanding, and the advanced coating industry desires to have new substrate glasses available that offer enhanced or optimized properties for applications at less than 200 GHz bandwidth range.

Thus, a desired embodiment of the invention is a glass making available an interference filter for a fiber optic system including a substrate and a film coating the substrate. Typically, the substrate is coated with a series of layers of differing materials having properties, e.g., indices of refraction, producing interference effects achieving the desired wavelength transmission spectrum. Fiber optic systems comprise one or more light sources, fiber optic transmission components, filters and end use components, e.g., detection, amplifiers, etc. Glasses of the invention and their properties are described in the following tables:

TABLE 1

Composition (mol %) and Properties

| Oxide/Property | Preferred | Most Preferred |
|---|---|---|
| $SiO_2$ | 35–75 | 40–70 |
| $GeO_2$ | 0–10 | 0–5 |
| $B_2O_3$ | 0–8 | 0–5 |
| $Al_2O_3$ | 0–8 | 0–5 |
| $Li_2O$ | >0–25 | >0–25 |
| $Na_2O$ | 0–60 | 0–35 |
| $K_2O$ | 0–6 | 0–5 |
| MgO | 0–35 | 0–25 |
| $\Sigma$ BaO, SrO, CaO, ZnO, PbO | 0–10 | 0–5 |
| $TiO_2$ | 0–5 | 0–3 |
| $La_2O_3$ | 0–30 | 0–12 |
| $RE_2O_3$ | 0–12 | 0–10 |
| $Y_2O_3$ | >0–30 | >0–25 |
| $As_2O_3$ | 0–0.5 | 0–0.3 |
| F | 0–5 | 0–3 |
| Sum $R_2O_3$, R = Al, B, La and RE | 0–40 | 0–40 |
| $n_d$ | >1.5 | 1.50–1.70, especially 1.50–1.65 |
| T (%) at 1550 nm for 1 mm | >88 | >90 |
| $CTE_{-30/+70}[\times 10^{-7}/C.]$ | $\geq$90, especially $\geq$110 | >100, especially >110 |
| $T_g$ [C.] | $\geq$350 C. | $\geq$400 C. |
| E [GPa] | >80 | >85 |

TABLE 2

Composition (mol %) and Properties

| | |
|---|---|
| $SiO_2$ | 40–60 |
| $GeO_2$ | 0–40 |
| $B_2O_3$ | 0–10 |
| $Al_2O_3$ | 0–4 |
| $Li_2O$ | >0–26 |
| $Na_2O$ | >0–26 |
| $K_2O$ | 0–15 |
| MgO | 0–15 |
| $\Sigma$ BaO, SrO, CaO, ZnO, PbO | 0–10 |
| $TiO_2$ | 0–9 |
| $ZrO2$ | 0–2 |
| $La_2O_3$ | 0–4 |
| $RE_2O_3$ | 0–4 |
| $Y_2O_3$ | >0–5 |
| $Sc_2O_3$ | 0–4 |
| $Nb_2O_5$ | 0–2 |

TABLE 2-continued

| | |
|---|---|
| F | 0–5 |
| Σ R$_2$O$_3$, R = Al, B, La and RE | 0–25 |
| As$_2$O$_3$ | 0–0.5 |

| Oxide/Property | Preferred |
|---|---|
| n$_d$ | >1.5 |
| T (%) at 1550 nm for 1 mm | >88 |
| CTE$_{-30/+70}$[× 10$^{-7}$/C.] | ≧90 |
| Tg [C.] | ≧350 |
| E [Gpa] | >80 |

TABLE 3

Composition (mol %) and Properties

| | |
|---|---|
| SiO$_2$ | 45.0–58.0% |
| B$_2$O$_3$ | 0.0–5.0% |
| Al$_2$O$_3$ | 0.0–3.0% |
| Li$_2$O | 6.5–16.5% |
| Na$_2$O | 7.0–24.0% |
| K$_2$O | 0.0–12.0% |
| MgO | 0.0–8.0% |
| CaO | 0.0–8.0% |
| SrO | 0.0–8.0% |
| BaO | 0.0–8.0% |
| TiO$_2$ | 0.0–12.0% |
| ZrO$_2$ | 0.5–5.5% |
| Ta$_2$O$_5$ | 0.0–1.0% |
| Gd$_2$O$_3$ + La$_2$O$_3$ + Y$_2$O$_3$ | 2.70–3.30% |
| As$_2$O$_3$ | 0.0–0.15% |

| Oxide/Property | Preferred | Most Preferred |
|---|---|---|
| n$_d$ | >1.5 | 1.50–1.70 |
| T (%) at 1550 nm for 1 mm | >88 | >90 |
| CTE$_{-30/+70}$[× 10$^{-7}$/C.] | ≧90 | >100 |
| Tg [C.] | 400–485 | 420–480 |
| E [Gpa] | >80 | >85 |

TABLE 4

Composition (mol %) and Properties

| | |
|---|---|
| SiO$_2$ | 45.0–58.0% |
| B$_2$O$_3$ | 0.0–5.0% |
| Li$_2$O | 6.5–16.5% |
| Na$_2$O | 7.0–24.0% |
| K$_2$O | 0.0–12.0% |
| MgO | 0.0–8.0% |
| CaO | 0.0–8.0% |
| SrO | 0.0–8.0% |
| BaO | 0.0–8.0% |
| TiO$_2$ | 0.0–12.0% |
| ZrO$_2$ | 0.5–5.5% |
| Ta$_2$O$_5$ | 0.0–1.0% |
| Gd$_2$O$_3$ + La$_2$O$_3$ | 2.70–3.30% |
| As$_2$O$_3$ | 0.0–0.15% |

| Oxide/Property | Preferred | Most Preferred |
|---|---|---|
| n$_d$ | >1.5 | 1.50–1.70 |
| T (%) at 1550 nm for 1 mm | >88 | >90 |
| CTE$_{-30/+70}$[× 10$^{-7}$/C.] | ≧90 | >100 |
| Tg [C.] | 400–485 | 420–480 |
| E [Gpa] | >80 | >85 |

RE=rare earth ions, excluding La, that do not impart unacceptable absorption at the wavelength of interest (e.g., 1450–1550 nm, especially 1480–1620 nm), i.e., do not degrade T overall beyond the numbers given above. As a more preferred example of acceptable absorption, RE allows for an internal transmission of >0.99 for a 1 mm thickness sample, thereby allowing for an insertion loss of <0.9 dB. Nd and Ho are non-limiting examples of rare earth ions that may be used in the current application.

Without being bound by theory, it is believed that the individual components of the glasses affect certain properties. It is believed that in glasses of the present invention SiO$_2$ and GeO$_2$, both are network formers and Y$_2$O$_3$ and La$_2$O$_3$ are intermediates that do participate as network formers. Na$_2$O is a network modifier that typically affects index, expansion, and transformation temperature. Li$_2$O is a network modifier that affects index expansion, transformation temperature, Young's modulus, and thermal conductivity. MgO is a network modifier that affects index, expansion, transformation temperature, Young's modulus, and thermal conductivity. Sc$_2$O$_3$ and other rare earth oxides in the prescribed amounts can be directly substituted for Y$_2$O$_3$ and La$_2$O$_3$. The addition of TiO$_2$ and/or ZrO$_2$ to the glass helps maintain durability.

Expansion and Young's modulus are properties that are normally inversely proportional to each other in glasses in that as one property is raised through compositional adjustments, the other is lowered (*Glass*, by Horst Scholze, 1991, published by Springer-Verlag). Surprisingly, the introduction of Li$_2$O and/or MgO in glasses of the present invention causes the above properties to become proportional to each other so that both can be raised together as needed to produce a stable glass substrate with the required properties of high expansion and high Young's modulus.

The substrates of the present invention may be made by conventional glass melting techniques. Raw materials can be melted in platinum crucibles and held at temperatures around 1400° C. for up to five hours.

The interference filter for a fiber optic system also includes at least one film desirably in the form of a layer. Such films can be selected from SiO$_2$, Ta$_2$O$_5$, HfO$_2$, etc. These can be applied by commercially available standard ion beam deposition systems such as the SPECTOR® system available from Ion Tech, Inc. of Fort Collins, Colo., or the Advanced Plasma Source 1104 System from Leybold Optics of Hanau, Germany. In addition to being particularly useful for DWDM filters, these glasses are also exceptionally useful as high expansion glasses for fabrication of hybrid structures that demand a high expansion glass with good chemical durability, e.g., for the purposes of longwave pass filters, polarizing components, band pass filters, etc. Preferred embodiments also include a glass comprising:

| Oxide | Mole % |
|---|---|
| SiO$_2$ | 45–55 |
| GeO$_2$ | 0–5 |
| B$_2$O$_3$ | 0–8 |
| Al$_2$O$_3$ | 0–2 |
| Li$_2$O | >0–17 |
| Na$_2$O | >0–19 |
| K$_2$O | 0–6 |
| MgO | 0–13 |
| Σ BaO, SrO, CaO, ZnO, PbO | 0–5 |
| TiO$_2$ | 0–5 |
| ZrO$_2$ | 0–1 |
| La$_2$O$_3$ | 0–3 |
| RE$_2$O$_3$ | 0–3 |

-continued

| Oxide | Mole % |
|---|---|
| $Y_2O_3$ | >0–4.5 |
| $Sc_2O_3$ | 0–3 |
| $Nb_2O_5$ | 0–1 |
| F | 0–3 |
| $\Sigma R_2O_3$, R = Al, B, La, and RE | 0–15 |
| $As_2O_3$ | 0–0.3 | and the above glass preferably having the following properties:

| Property | Range |
|---|---|
| $n_d$ | 1.50–1.70 |
| T (%) at 1550 nm for 1.0 mm | >90 |
| CTE (–30 to +70° C.) × $10^{-7}/°$ C. | $\geq$100 |
| Tg (° C.) | $\geq$400 |
| E [GPa] | >85 | as well as glass comprising:

| Oxide | Mole % |
|---|---|
| $SiO_2$ | 46.0–52.0 |
| $B_2O_3$ | 0.0–1.0 |
| $Al_2O_3$ | 0.0–1.5 |
| $Li_2O$ | 7.0–16.0 |
| $Na_2O$ | 7.0–20.0 |
| $K_2O$ | 4.0–12.0 |
| MgO | 0.0–7.5 |
| CaO | 0.0–7.5 |
| SrO | 0.0–7.5 |
| BaO | 0.0–7.5 |
| $TiO_2$ | 1.0–10.5 |
| $ZrO_2$ | 1.5–5.0 |
| $Ta_2O_5$ | 0.3–0.7 |
| $La_2O_3 + Gd_2O_3 + Y_2O_3$ | 2.6–2.9 |
| $As_2O_3$ | 0.0–0.15 | the above glass preferably having the following properties:

| Property | Range |
|---|---|
| $n_d$ | 1.50–1.70 |
| T (%) at 1550 nm for 1.0 mm | >88 |
| CTE (–30 to +70° C.) × $10^{-7}/°$ C. | >100 |
| Tg (° C.) | 415–480 |
| E [GPa] | >80 | and a glass comprising:

| Oxide | Mole % |
|---|---|
| $SiO_2$ | 46.0–52.0 |
| $B_2O_3$ | 0.0–1.0 |
| $Li_2O$ | 7.0–16.0 |
| $Na_2O$ | 15.5–20.0 |
| $K2O$ | 4.0–5.5 |
| MgO | 0.0–7.5 |
| CaO | 0.0–7.5 |
| SrO | 0.0–7.5 |
| BaO | 0.0–7.5 |
| TiO2 | 1.0–10.5 |
| ZrO2 | 2.5–5.0 |
| Ta2O5 | 0.3–0.7 |
| La2O3 + Gd2O3 | 2.7–2.8 |
| As2O3 | 0.0–0.15 | the above glass preferably having the following properties:

| Property | Range |
|---|---|
| $n_d$ | 1.50–1.70 |
| T (%) at 1550 mn for 1.0 mm | >88 |
| CTE (–30 to +70° C.) × $10^{-7}/°$ C. | >100 |
| Tg (° C.) | 415–480 |
| E [GPa] | >80 |

Preferred embodiments also include an interference filter comprising a glass substrate having at least two interference layers coated thereon, wherein the glass substrate comprises one of the compositional spaces above.

Preferred embodiments also include a fiber optic system comprising a light source, a fiber optic transmission component, a receiver of transmitted radiation and an interference filter comprising a glass substrate having at least two interference layers coated thereon, said glass substrate comprising one of the glass spaces above.

Moreover, preferred embodiments include a process for making glasses according to the invention comprising melting raw materials corresponding to oxides in the glass, refining a resultant glass melt, casting the melt in a mold and optionally annealing, or casting into a mold a glass melt produced from raw materials corresponding to oxides in the glass.

Additionally, preferred embodiments include a demultiplexing optical component comprising the above interference filter and a method of demultiplexing, comprising passing an optical signal of multiple wavelengths through a demultiplexing optical component above, whereby one or more wavelengths of interest are separated.

Finally, preferred embodiments include a process for making an interference filter comprising coating any glass described above.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following example, all temperatures are set forth uncorrected in degrees Celsius; and, unless otherwise indicated, all parts and percentages are by mole.

The entire disclosures of all applications, patents and publications, cited above or below including provisional applications number 60/259,706 filed Jan. 5, 2001, and 60/317,493 filed Sep. 7, 2001, are hereby incorporated by reference.

EXAMPLES

The glasses in the Tables below were prepared as follows. Chemical compounds were weighed in the proper amounts to produce the desired composition and melted within a platinum crucible at temperatures in excess of 1300° C. to produce vitrified material. Once this batch melting was complete, the glass melt was stirred and refined at temperatures up to 1500° C. for several hours prior to casting the molten glass into a steel mold. Cast glasses were annealed at temperatures between 420 and 500° C. for two hours before being cooled to room temperature at a cooling rate of 10° C./hr. to 40° C./hr.

TABLE 4

| Oxide Mole % | 1 (Comparative) | 2 | 3 | 4 | 5 |
|---|---|---|---|---|---|
| $SiO_2$ | 69.93 | 59.93 | 54.93 | 54.01 | 49.10 |
| $Li_2O$ |  | 10.00 | 10.00 | 9.83 | 9.83 |
| $Na_2O$ | 24.98 | 24.98 | 24.98 | 24.56 | 24.57 |
| MgO |  |  | 5.00 | 4.91 | 9.83 |
| $Y_2O_3$ | 4.99 | 4.99 | 4.99 | 4.91 | 4.91 |
| F |  |  |  | 1.68 | 1.66 |
| $As_2O_3$ | 0.10 | 0.10 | 0.10 | 0.10 | 0.10 |

The glass castings produced were next cut to yield characterization samples with the following property results:

TABLE 5

| Property | Value | 1 (Comparative) | 2 | 3 | 4 | 5 |
|---|---|---|---|---|---|---|
| $n_d$ | >1.5 | 1.54 | 1.56 | 1.56 | 1.56 | 1.57 |
| CTE −30/+70 × $10^{-7}/°$ C. | ≧90 | 99 | 113 | 113 | 114 | 114 |
| T (%) at 1550 nm for 1.0 mm | >88 | 92.1 | 91.2 | 91.4 | 91.4 | 91.4 |
| Tg (° C.) | ≧350 | 600 | 474 | 449 | 438 | 431 |
| E (GPa) | >80 | 74 | 83 | 85 | 86 | 89 |

Based on these measured properties, glasses of the invention are clearly useful as improved substrate glasses for filtering applications.

Additional properties of these glasses have been determined. These are detailed below in Table 6. The coefficient of thermal expansion was measured using push-rod dilatometric methods over −30 to +70° C. with a rate of change of 1.5° C./min. The digital percent (total) transmittance was measured at 1.5 μm (thickness 1.0 mm) using a Perkin-Elmer Lambda 9 spectrophotometer. The refractive index and Vd (Abbe number) were measured using a v-block refractometer in accordance with Journal of Scientific Instruments 18 234 (1941). Youngs modulus and Poisson ratio were determined by utilizing a Matec Pulse Echo Overlap System model 6000, or a J. W. Lemmens Grind-oSonic Impulse Excitation Technique Instrument Model MK5 "Industrial". Thermal conductivity was measured using a Dynatech C-Matic Thermal Conductance Tester model TCHM-DV. $T_g$ was measured using either a Harrop Laboratories Dilatometer Model AT-710 or a Theta Industries Dilatometer Model 1200 C.

TABLE 6

| Property | 1 (Comparative) | 2 | 3 | 4 | 5 |
|---|---|---|---|---|---|
| $n_F-n_C$ | 0.009108 | 0.010483 | 0.010642 | 0.010568 | 0.010843 |
| $V_d$ | 59.13 | 53.15 | 52.98 | 53.17 | 52.43 |
| Density g/cm³ | 2.71 | 2.75 | 2.78 | 2.78 | 2.81 |
| CTE 20–300 × $10^{-7}/°$ C. | 110 | 135 | 137 | 138 | 138 |
| Poisson's Ratio | 0.231 | 0.247 | 0.249 | 0.248 | 0.255 |

TABLE 7

| Oxide Mole % | 6 (comparative) | 7 | 8 | 9 | 10 |
|---|---|---|---|---|---|
| $SiO_2$ | 69.93 | 49.10 | 59.93 | 49.10 | 44.10 |
| $Li_2O$ |  | 25.80 | 10.00 | 9.83 | 9.83 |
| $Na_2O$ | 24.98 | 8.60 | 24.98 | 24.57 | 24.57 |
| MgO |  | 9.83 |  | 9.83 | 9.83 |
| $Y_2O_3$ | 4.99 | 4.91 | 4.99 | 4.91 | 4.91 |
| F |  | 1.66 |  | 1.66 | 1.66 |
| $TiO_2$ |  |  |  |  | 5.00 |
| $As_2O_3$ | 0.10 | 0.10 | 0.10 | 0.10 | 0.10 |

The glass castings produced were next cut to yield characterization samples with the following property results:

TABLE 8

| Property | Value | 6 (comparative) | 7 | 8 | 9 | 10 |
|---|---|---|---|---|---|---|
| $n_d$ | >1.5 | 1.54 | 1.59 | 1.56 | 1.57 | 1.60 |
| CTE × $10^{-7}$/K (−30 to +70) | ≧90 | 99 | 101 | 113.5 | 113 | 115 |
| T (%) at 1550 nm for 1.0 mm | >88 | 92.1 | 91.0 | 91.2 | 91.4 | 90.8 |
| $T_g$ (° C.) | ≧350 | 600 | 438 | 474 | 431 | 451 |
| E (GPa) | >80 | 74 | 101.5 | 83 | 90 | 93 |

Based on these measured properties, glasses of the invention are clearly useful as improved substrate glasses for filtering applications.

Additional properties of these glasses have been determined, as above. These are detailed below in Table 9.

TABLE 9

| Property | 6 (comparative) | 7 | 8 | 9 | 10 |
|---|---|---|---|---|---|
| $n_F - n_C$ | 0.009108 | 0.010859 | 0.010483 | 0.010843 | 0.013548 |
| $V_d$ | 59.13 | 54.50 | 53.15 | 52.43 | 44.64 |
| density (g/cm³) | 2.71 | 2.80 | 2.76 | 2.81 | 2.89 |
| CTE × $10^{-7}$/K (20–300) | 110 | 126 | 135 | 138 | 140 |
| Thermal Conductivity (W/mK) | | | | | |
| 25° C. | 0.881 | 1.14 | 0.893 | 0.981 | 1.01 |
| 90° C. | 0.912 | 1.21 | 0.926 | 1.04 | 1.07 |
| Poisson's Ratio | 0.23 | 0.26 | 0.25 | 0.26 | 0.25 |

TABLE 10

| Oxide Mole % | 11 | 12 | 13 | 14 | 15 |
|---|---|---|---|---|---|
| $SiO_2$ | 54.46 | 51.56 | 51.56 | 48.90 | 47.12 |
| $B_2O_3$ | 0.52 | 0.44 | 0.45 | 0.0 | 0.0 |
| $Li_2O$ | 7.34 | 7.57 | 7.56 | 12.90 | 13.78 |
| $Na_2O$ | 20.69 | 18.90 | 18.90 | 18.89 | 18.89 |
| $K_2O$ | 4.19 | 4.89 | 4.89 | 4.89 | 4.45 |
| MgO | 4.20 | 7.12 | 7.12 | 0.0 | 0.0 |
| CaO | 4.20 | 0.0 | 0.0 | 0.0 | 0.0 |
| SrO | 0.0 | 0.0 | 0.0 | 0.0 | 0.0 |
| BaO | 0.0 | 0.0 | 0.0 | 0.0 | 0.0 |
| $TiO_2$ | 0.0 | 3.56 | 3.55 | 8.44 | 8.89 |
| $ZrO_2$ | 0.53 | 2.67 | 2.67 | 2.66 | 3.56 |
| $Ta_2O_5$ | 0.52 | 0.44 | 0.44 | 0.45 | 0.45 |
| $La_2O_3$ | 3.25 | 2.67 | 0.0 | 0.0 | 0.0 |
| $Gd_2O_3$ | 0.0 | 0.0 | 2.67 | 2.76 | 2.76 |
| $As_2O_3$ | 0.11 | 0.11 | 0.11 | 0.11 | 0.11 |

The glass castings produced were next cut to yield characterization samples with the following property results:

TABLE 11

| Property | Value | 11 | 12 | 13 | 14 | 15 |
|---|---|---|---|---|---|---|
| CTE−30/+70 × 10−7/C. | ≧90 | 115.8 | 109.1 | 106.5 | 114.0 | 113.3 |
| Tg C. | 400–485 | 419 | 443 | 456 | 452 | 453 |
| nd | >1.5 | 1.57637 | 1.59731 | 1.59388 | 1.62656 | 1.63745 |
| T (%) at 1550 nm for 1.0 mm | >88 | 91.7 | 90.9 | 91.0 | 90.1 | 89.9 |
| Youngs Modulus [GPa] | >80 | 82.2 | 84.4 | 85.7 | 88.3 | 90.1 |

Based on these measured properties, glasses of the invention are clearly useful as improved substrate glasses for filtering applications.

Additional properties of these glasses have been determined, as above. These are detailed below in Table 12.

TABLE 12

| Property | 11 | 12 | 13 | 14 | 15 |
|---|---|---|---|---|---|
| Abbe number | 51.81 | 46.72 | 47.08 | 41.91 | 40.87 |

TABLE 13

| Oxide Mole % | 16 | 17 | 18 |
|---|---|---|---|
| $SiO_2$ | 47.17 | 47.17 | 49.17 |
| $B_2O_3$ | | | |
| $Al_2O_3$ | | | 1.0 |
| $Li_2O$ | 10.80 | 10.80 | 7.80 |
| $Na_2O$ | 15.92 | 13.92 | 7.92 |
| $K_2O$ | 4.45 | 4.45 | 10.45 |
| MgO | 3.00 | 3.00 | |
| CaO | | | 4.00 |
| SrO | | 2.00 | 6.00 |
| BaO | 6.00 | 6.00 | 6.00 |
| ZnO | | | |
| $TiO_2$ | 7.40 | 7.40 | 2.40 |
| $ZrO_2$ | 2.06 | 2.06 | 2.06 |
| $Ta_2O_5$ | 0.45 | 0.45 | 0.45 |
| $La_2O_3$ | | | |
| $Gd_2O_3$ | | | |
| $Y_2O_3$ | 2.76 | 2.76 | 2.76 |
| Total | 100.1 | 100.1 | 100.1 |

The glass casting produced were next to yield characterization samples with the following property results.

TABLE 14

| Property | 16 | 17 | 18 |
|---|---|---|---|
| CTE-30/+70 X10-7/C | 108.1 | 103.4 | |
| $T_g$ C. | 452 | 462 | |
| nd | 1.63390 | 1.64000 | |
| ABBE NUMBER 40 C/hr | 42.70 | 42.78 | |
| DENSITY gm/cm3 | 3.11 | 3.15 | |
| T % at 1550 mm for 1 nm | 90.4 | 90.0 | |
| E Gpa | 88.8 | 92.7 | |

The preceding examples can be repeated with similar success by substituting the generically or specifically described reactants and/or operating conditions of this invention for those used in the preceding example.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A glass comprising:

| Oxide | Mole % |
|---|---|
| $SiO_2$ | 35–75 |
| $GeO_2$ | 0–10 |
| $B_2O_3$ | 0–8 |
| $Al_2O_3$ | 0–8 |
| $Li_2O$ | >0–25 |
| $Na_2O$ | 0–60 |
| $K_2O$ | 0–6 |
| MgO | 0 |
| Σ BaO, SrO, CaO, ZnO, PbO | 0–10 |
| $TiO_2$ | 0–5 |
| $La_2O_3$ | 0–30 |
| $RE_2O_3$ | 0–12 |
| $Y_2O_3$ | >0–30 |
| $As_2O_3$ | 0–0.5 |
| F | 0–5 |
| Sum $R_2O_3$, R = Al, B, La and RE | 0–40 | wherein RE represents rare earth ions, excluding La.

2. A glass according to claim 1, having the following properties:

| Property | Range |
|---|---|
| $n_d$ | >1.5 |
| T (%) at 1550 nm for 1.0 mm | >88 |
| CTE (−30 to +70° C.) × $10^{-7}$/° C. | ≧90, especially ≧110 |
| E (GPa) | >80 |
| Tg (° C.) | ≧350. |

3. A glass according to claim 1, comprising:

| Oxide | Mole % |
|---|---|
| $SiO_2$ | 40–70 |
| $GeO_2$ | 0–5 |
| $B_2O_3$ | 0–5 |
| $Al_2O_3$ | 0–5 |
| $Li_2O$ | >0–25 |
| $Na_2O$ | 0–35 |
| $K_2O$ | 0–5 |
| MgO | 0 |
| Σ BaO, SrO, CaO, ZnO, PbO | 0–5 |
| $TiO_2$ | 0–3 |
| $La_2O_3$ | 0–12 |
| $RE_2O_3$ | 0–10 |
| $Y_2O_3$ | >0–25 |
| $As_2O_3$ | 0–0.3 |
| F | 0–3 |
| Sum $R_2O_3$, R = Al, B, La and RE | 0–40. |

4. A glass according to claim 3, having th following properties:

| Property | Range |
|---|---|
| $n_d$ | 1.50–1.70, especially 1.50–1.65 |
| T (%) at 1550 nm for 1.0 mm | >90 |
| CTE (−30 to +70° C.) × | >100, especially >110 |

-continued

| Property | Range |
|---|---|
| $10^{-7}/°C$. | |
| Tg (°C.) | ≧400 |
| E [GPa] | >85. |

5. A glass comprising:

| Oxide | Mole % |
|---|---|
| $SiO_2$ | 40–60 |
| $GeO_2$ | 0–10 |
| $B_2O_3$ | 0–10 |
| $Al_2O_3$ | 0–4 |
| $Li_2O$ | >0–26 |
| $Na_2O$ | >0–26 |
| $K_2O$ | 0–15 |
| MgO | 0 |
| Σ BaO, SrO, CaO, ZnO, PbO | 0–10 |
| $TiO_2$ | 0–9 |
| $ZrO_2$ | 0–2 |
| $La_2O_3$ | 0–4 |
| $Re_2O_3$ | 0–4 |
| $Y_2O_3$ | >0–5 |
| $Sc_2O_3$ | 0–4 |
| $Nb_2O_5$ | 0–2 |
| F | 0–5 |
| Σ $R_2O_3$, R = Al, B, La, and RE | 0–25 |
| $As_2O_3$ | 0–0.5 | wherein RE represents rare earth ions, excluding La.

6. A glass according to claim 5, having the following properties:

| Property | Range |
|---|---|
| $n_d$ | >1.5 |
| T (%) at 1550 nm for 1.0 mm | >88 |
| CTE (−30 to +70° C.) × $10^{+7}/°C$. | ≧90 |
| E (GPa) | >80 |
| Tg (°C.) | ≧350. |

7. A glass according to claim 5 comprising:

| Oxide | Mole % |
|---|---|
| $SiO_2$ | 45–55 |
| $GeO_2$ | 0–5 |
| $B_2O_3$ | 0–8 |
| $Al_2O_3$ | 0–2 |
| $Li_2O$ | >0–17 |
| $Na_2O$ | >0–19 |
| $K_2O$ | 0–6 |
| MgO | 0 |
| Σ BaO, SrO, CaO, ZnO, PbO | 0–5 |
| $TiO_2$ | 0–5 |
| $ZrO_2$ | 0–1 |
| $La_2O_3$ | 0–3 |
| $RE_2O_3$ | 0–3 |
| $Y_2O_3$ | >0–4.5 |
| $Sc_2O_3$ | 0–3 |
| $Nb_2O_5$ | 0–1 |
| F | 0–3 |

-continued

| Oxide | Mole % |
|---|---|
| Σ $R_2O_3$, R = Al, B, La, and RE | 0–15 |
| $As_2O_3$ | 0–0.3. |

8. A glass according to claim 7, having the following properties:

| Property | Range |
|---|---|
| $n_d$ | 1.50–1.70 |
| T (%) at 1550 nm for 1.0 mm | >90 |
| CTE (−30 to +70° C.) × $10^{-7}/°C$. | ≧100 |
| Tg (°C.) | ≧400 |
| E [GPa] | >85. |

9. A glass comprising:

| Oxide | Mole % |
|---|---|
| $SiO_2$ | 45.0–58.0 |
| $B_2O_3$ | 0.0–5.0 |
| $Al_2O_3$ | 0.0–3.0 |
| $Li_2O$ | 6.5–16.5 |
| $Na_2O$ | 7.0–24.0 |
| $K_2O$ | 0.0–12.0 |
| MgO | 0.0–8.0 |
| CaO | 0.0–8.0 |
| SrO | 0.0–8.0 |
| BaO | 0.0–8.0 |
| $TiO_2$ | 0.0–12.0 |
| $ZrO_2$ | 0.5–5.5 |
| $Ta_2O_5$ | 0.0–1.0 |
| $Gd_2O_3 + La_2O_3 + Y_2O_3$ | 2.70–3.30 |
| $As_2O_3$ | 0.0–0.15 | wherein RE represents rare earth ions, excluding La.

10. A glass according to claim 9, having the following properties:

| Property | Range |
|---|---|
| $n_d$ | >1.5 |
| T (%) at 1550 nm for 1.0 mm | >88 |
| CTE (−30 to +70° C.) × $10^{-7}/°C$. | ≧90 |
| E (GPa) | >80 |
| Tg (°C.) | 400–485. |

11. A glass according to claim 9, comprising:

| Oxide | Mole % |
|---|---|
| $SiO_2$ | 46.0–52.0 |
| $Al_2O_3$ | 0.0–1.5 |
| $B_2O_3$ | 0.0–1.0 |
| $Li_2O$ | 7.0–16.0 |
| $Na_2O$ | 7.0–20.0 |
| $K_2O$ | 4.0–12.0 |
| MgO | 0.0 |

-continued

| Oxide | Mole % |
|---|---|
| CaO | 0.0–7.5 |
| SrO | 0.0–7.5 |
| BaO | 0.0–7.5 |
| $TiO_2$ | 1.0–10.5 |
| $ZrO_2$ | 1.5–5.0 |
| $Ta_2O_5$ | 0.3–0.7 |
| $La_2O_3 + Gd_2O_3 + Y_2O_3$ | 2.6–2.9 |
| $As_2O_3$ | 0.0–0.15. |

12. A glass according to claim 11, having the following properties:

| Property | Range |
|---|---|
| $n_d$ | 1.50–1.70 |
| T (%) at 1550 nm for 1.0 mm | >88 |
| CTE (−30 to +70° C.) × $10^{-7}$/° C. | >100 |
| Tg (° C.) | 415–480 |
| E [GPa] | >80. |

13. An interference filter comprising a glass substrate having at least two interference layers coated thereon, wherein the glass substrate is a glass according to claim 1.

14. An interference filter comprising a glass substrate having at least two interference layers coated thereon, wherein the glass substrate is a glass according to claim 5.

15. An interference filter comprising a glass substrate having at least two interference layers coated thereon, wherein the glass substrate is a glass according to claim 9.

16. A fiber optic system comprising a light source, a fiber optic transmission component, a receiver of transmitted radiation and an interference filter comprising a glass substrate having at least two interference layers coated thereon, said glass substrate comprising a glass according to claim 1.

17. A fiber optic system comprising a light source, a fiber optic transmission component, a receiver of transmitted radiation and an interference filter comprising a glass substrate having at least two interference layers coated thereon, said glass substrate comprising a glass according to claim 5.

18. A fiber optic system comprising a light source, a fiber optic transmission component, a receiver of transmitted radiation and an interference filter comprising a glass substrate having at least two interference layers coated thereon, said glass substrate comprising a glass according to claim 9.

19. A process for making a glass according to claim 1, comprising melting raw materials corresponding to oxides in the glass, refining a resultant glass melt, casting the melt in a mold and optionally annealing.

20. A process for making a glass according to claim 1, comprising casting into a mold a glass melt produced from raw materials corresponding to oxides in the glass.

21. A process for making a glass according to claim 5, comprising casting into a mold a glass melt produced from raw materials corresponding to oxides in the glass.

22. A process for making a glass according to claim 9, comprising casting into a mold a glass melt produced from raw materials corresponding to oxides in the glass.

23. A demultiplexing optical component comprising the interference filter of claim 13.

24. A demultiplexing optical component comprising the interference filter of claim 14.

25. A demultiplexing optical component comprising the interference filter of claim 15.

26. A method of demultiplexing, comprising passing an optical signal of multiple wavelengths through a demultiplexing optical component according to claim 23.

27. A method of demultiplexing, comprising passing an optical signal of multiple wavelengths through a demultiplexing optical component according to claim 24.

28. A method of demultiplexing, comprising passing an optical signal of multiple wavelengths through a demultiplexing optical component according to claim 25.

29. A glass comprising:

| Oxide | Mole % |
|---|---|
| $SiO_2$ | 35–75 |
| $GeO_2$ | 0–10 |
| $B_2O_3$ | 0–8 |
| $Al_2O_3$ | 0–8 |
| $Li_2O$ | >0–25 |
| $Na_2O$ | 0–60 |
| $K_2O$ | 0–6 |
| MgO | 0 |
| Σ BaO, SrO, CaO, ZnO, PbO | 0–10 |
| $TiO_2$ | 0–5 |
| $La_2O_3$ | 0–30 |
| $RE_2O_3$ | 0–12 |
| $Y_2O_3$ | 4.5–30 |
| $As_2O_3$ | 0–0.5 |
| F | 0–5 |
| Sum $R_2O_3$, R = Al, B, La and RE | 0–40 | wherein RE represents rare earth ions, excluding La.

30. A glass according to claim 1, comprising:

| Oxide | Mole % |
|---|---|
| $SiO_2$ | 40–70 |
| $GeO_2$ | 0–5 |
| $B_2O_3$ | 0–5 |
| $Al_2O_3$ | 0–5 |
| $Li_2O$ | >0–25 |
| $Na_2O$ | 0–35 |
| $K_2O$ | 0–5 |
| MgO | 0 |
| Σ BaO, SrO, CaO, ZnO, PbO | 0–5 |
| $TiO_2$ | 0–3 |
| $La_2O_3$ | 0–12 |
| $RE_2O_3$ | 0–10 |
| $Y_2O_3$ | 4.5–25 |
| $As_2O_3$ | 0–0.3 |
| F | 0–3 |
| Sum $R_2O_3$, R = Al, B, La and RE | 0–40. |

31. A glass comprising:

| Oxide | Mole % |
|---|---|
| $SiO_2$ | 40–60 |
| $GeO_2$ | 0–10 |
| $B_2O_3$ | 0–10 |
| $Al_2O_3$ | 0–4 |
| $Li_2O$ | >0–26 |
| $Na_2O$ | >0–26 |
| $K_2O$ | 0–15 |

-continued

| Oxide | Mole % |
|---|---|
| MgO | 0 |
| Σ BaO, SrO, CaO, ZnO, PbO | 0–10 |
| $TiO_2$ | 0–9 |
| $ZrO_2$ | 0–2 |
| $La_2O_3$ | 0–4 |
| $Re_2O_3$ | 0–4 |
| $Y_2O_3$ | 4.5-0-5 |
| $Sc_2O_3$ | 0–4 |
| $Nb_2O_5$ | 0–2 |
| F | 0–5 |
| Σ $R_2O_3$, R = Al, B, La, and RE | 0–25 |
| $As_2O_3$ | 0–0.5 | wherein RE represents rare earth ions, excluding La.

32. A glass according to claim 5 comprising:

| Oxide | Mole % |
|---|---|
| $SiO_2$ | 45–55 |
| $GeO_2$ | 0–5 |
| $B_2O_3$ | 0–8 |
| $Al_2O_3$ | 0–2 |
| $Li_2O$ | >0–17 |
| $Na_2O$ | >0–19 |
| $K_2O$ | 0–6 |
| MgO | 0 |
| Σ BaO, SrO, CaO, ZnO, PbO | 0–5 |
| $TiO_2$ | 0–5 |
| $ZrO_2$ | 0–1 |
| $La_2O_3$ | 0–3 |
| $RE_2O_3$ | 0–3 |
| $Y_2O_3$ | 4.5–4.9 |
| $Sc_2O_3$ | 0–3 |
| $Nb_2O_5$ | 0–1 |
| F | 0–3 |
| Σ $R_2O_3$, R = Al, B, La, and RE | 0–15 |
| $As_2O_3$ | 0–0.3. |

* * * * *